United States Patent [19]

Nonaka et al.

[11] Patent Number: 5,223,027
[45] Date of Patent: Jun. 29, 1993

[54] POLYHALOGENATED PHTHALOCYANINE, PROCESS FOR THE PRODUCTION THEREOF, AND USE THEREOF

[75] Inventors: Yoshiyuki Nonaka; Junichi Tsuchida; Masami Shirao; Michichika Hikosaka, all of Tokyo, Japan

[73] Assignee: Toyo Ink Manufacturing Co., Ltd., Tokyo, Japan

[21] Appl. No.: 773,116

[22] Filed: Oct. 8, 1991

[30] Foreign Application Priority Data

Oct. 22, 1990 [JP] Japan .................. 2-283754

[51] Int. Cl.$^5$ .................. C09D 11/00; C09B 47/10
[52] U.S. Cl. .................. 106/20 R; 106/410; 106/412; 540/136; 540/138; 540/139; 540/140
[58] Field of Search ............... 106/20, 410, 412, 20 R, 106/23 D; 540/136, 138, 139, 140

[56] References Cited

U.S. PATENT DOCUMENTS

| | | | |
|---|---|---|---|
| 2,247,752 | 7/1941 | Fox | 540/138 |
| 2,873,279 | 2/1959 | Randall et al. | 540/138 |
| 3,009,919 | 11/1961 | Taras et al. | 540/138 |
| 3,231,583 | 1/1966 | Frey | 540/138 |
| 4,067,881 | 1/1978 | Gerren et al. | 540/138 |
| 4,077,974 | 3/1978 | Wessling | 540/138 |
| 4,297,281 | 10/1981 | Wessling | 540/138 |
| 4,452,740 | 6/1984 | Pepoy | 540/138 |
| 4,695,436 | 9/1987 | Wyndham et al. | 423/135 |
| 4,948,884 | 8/1990 | Nonaka et al. | 540/138 |

FOREIGN PATENT DOCUMENTS

| | | |
|---|---|---|
| 0397939 | 11/1990 | European Pat. Off. |
| 445696 | 2/1968 | Switzerland |
| 1578931 | 11/1980 | United Kingdom |

OTHER PUBLICATIONS

Toyo Ink, WPIL, File Supplier AN-84-273028 Abstract Japan 59-168070 Sep. 1984.
Toyo Ink, Patent Abstracts of Japan, vol. 14, No. 47 (C-682) (3990) Jan. 29, 1990 (JP 01/279975).

*Primary Examiner*—Mark L. Bell
*Assistant Examiner*—Helene Klemanski
*Attorney, Agent, or Firm*—Wenderoth, Lind & Ponack

[57] ABSTRACT

A polyhalogenated phthalocyanine obtained by halogenation of phthalocyanine in the presence of aluminum chloride and contains not more than 0.02 part by weight, per 100 parts by weight of the phthalocyanine before the halogenation, of water-insoluble inorganic impurities derived from the aluminum chloride contributes to improvement of a printing ink in form plate abrasion properties.

11 Claims, No Drawings

POLYHALOGENATED PHTHALOCYANINE, PROCESS FOR THE PRODUCTION THEREOF, AND USE THEREOF

FIELD OF THE INVENTION

The present invention relates to a polyhalogenated phthalocyanine for use in a printing ink, a process for the production of said polyhalogenated phthalocyanine and use thereof. More specifically, the present invention relates to a polyhalogenated phthalocyanine for use in a printing ink, which is improved in form plate abrasion properties, a process for the production of said polyhalogenated phthalocyanine and a printing ink composition containing said polyhalogenated phthalocyanine.

PRIOR ART OF THE INVENTION

It is conventionally general practice to halogenate phthalocyanine in the presence of aluminum chloride.

For example, there have been employed a method in which phthalocyanine is chlorinated while the phthalocyanine is dissolved in a eutectic salt of aluminum chloride and sodium chloride (JP-A-52-155625), a method in which phthalocyanine is halogenated in titanium tetrachloride in the presence of aluminum chloride (JP-A-1-279975), and the like. Polyhalogenated phthalocyanines obtained by these methods are crude pigments having high cohesive force, and these crude pigments are further subjected to a step of wet milling or treatment with sulfuric acid, or some other steps to prepare a final pigment.

The polyhalogenated phthalocyanine obtained as a final pigment is combined with a vehicle to prepare a printing ink.

A printing ink containing a polyhalogenated phthalocyanine obtained by any one of the above conventional methods has poor form plate abrasion properties and decreases the form plate life, which problem particularly occurs with a gravure cylinder.

It is conventionally understood that the form plate abrasion is primarily due to high hardness of polyhalogenated phthalocyanine. There have therefore been proposed methods in which the polyhalogenated phthalocyanine is subjected to treatment with a variety of coating agents, surfactants, resins, etc., in order to improve the polyhalogenated phthalocyanine in form plate abrasion properties. However, the effects of these methods have not at all been satisfactory.

SUMMARY OF THE INVENTION

It is an object of the present invention to overcome the defect of the form plate abrasion of a polyhalogenated phthalocyanine obtained by halogenating phthalocyanine in the presence of aluminum chloride.

It is another object of the present invention to provide a polyhalogenated phthalocyanine for use in a printing ink which is improved in form plate abrasion properties.

It is further another object of the present invention to provide a process for the production of the above polyhalogenated phthalocyanine.

It is still further another object of the present invention to provide a printing ink composition containing the above polyhalogenated phthalocyanine.

According to the present invention, there is provided a polyhalogenated phthalocyanine for use in a printing ink, which is obtained by halogenation of phthalocyanine in the presence of aluminum chloride and contains not more than 0.02 part by weight, per 100 parts by weight of the phthalocyanine before the halogenation, of water-insoluble inorganic impurities derived from the aluminum chloride.

Further, according to the present invention, there is provided a process for the production of the above polyhalogenated phthalocyanine for use in a printing ink, which comprises any one of the following methods (a), (b) and (c);

(a) a method comprising halogenating phthalocyanine in a eutectic salt of purified aluminum chloride and sodium chloride, (b) a method comprising removing water-insoluble inorganic impurities from a eutectic salt of aluminum chloride and sodium chloride and halogenating phthalocyanine in the resultant eutectic salt, and (c) a method comprising halogenating phthalocyanine in titanium tetrachloride in the presence of purified aluminum chloride.

Furthermore, according to the present invention, there is provided a printing ink composition which comprises the above polyhalogenated phthalocyanine for use in a printing ink and a vehicle.

DETAILED DESCRIPTION OF THE INVENTION

The present inventors have made studies for a long time to improve the form plate abrasion of a polyhalogenated phthalocyanine obtained by halogenating phthalocyanine in the presence of aluminum chloride, and as a result, unexpectedly found that the defect in the form plate abrasion properties is due to a trace amount of water-insoluble inorganic impurities contained in the aluminum chloride. On the basis of this finding, the present invention has been completed.

That is, it has been found that when the content of water-insoluble inorganic impurities derived from aluminum chloride in a polyhalogenated phthalocyanine is not more than 0.02 part by weight, more preferably 0.01 part by weight per 100 parts by weight of a phthalocyanine before the halogenation, such a polyhalogenated phthalocyanine exhibits remarkably improved form plate abrasion properties.

In the present invention, a non-halogenated copper phthalocyanine is used as a phthalocyanine. However, such a phthalocyanine may be that which is partially halogenated. In addition to copper, the central metal may be iron, nickel, aluminum, titanium, or the like. Further, the phthalocyanine used in the present invention may be metal-free or may have a mixture of at least two of the above metals as a central metal.

The method of halogenating a phthalocyanine in the presence of aluminum chloride, used in the present invention, is selected from a method in which a phthalocyanine is halogenated while the phthalocyanine is dissolved in a eutectic salt of aluminum chloride and sodium chloride (JP-A-52-155625), a method in which a phthalocyanine is halogenated in titanium tetrachloride in the presence of aluminum chloride (JP-A-1-279975), and the like. In the polyhalogenated phthalocyanine of the present invention, the number of halogens substituted on a phthalocyanine is not less than 4 per phthalocyanine molecule. In view of practical use of the polyhalogenated phthalocyanine as a green pigment, the number of halogens substituted is preferably not less than 12.

The aluminum chloride used in the halogenation of a phthalocyanine in the present invention is industrially produced by blowing chlorine gas into molten aluminum. For melting aluminum, it is required to heat the aluminum up to about 700° C., and a reactor made of a refractory material is hence used. As a result, the resultant aluminum chloride always contains a trace amount of impurities from the refractory material. Therefore, aluminum chloride as an industrial product inevitably contains a trace amount of water-insoluble inorganic impurities. These impurities can be identified as a filtration residue when such aluminum chloride is fully dissolved in water and filtered. These impurities have been analyzed by the present inventors and found to be composed mainly of inorganic substances derived from alumina-silica refractory materials such as $Al_2Si_4O_{10}$. Since the content of these impurities in aluminum chloride as an industrial product is extremely as small as about 200 ppm, no attention has been paid to the relation of these impurities to the defect in form plate abrasion properties.

The present invention has its characteristic feature in that a printing ink containing a polyhalogenated phthalocyanine which is almost free from such water-insoluble inorganic impurities is remarkably improved in plate abrasion properties.

In order to prevent the inclusion of the water-insoluble inorganic impurities in a polyhalogenated phthalocyanine, it is desirable to purify aluminum chloride fully. The method for the purification of aluminum chloride is not specially limited, and a variety of purification methods can be employed. The typical purification methods are as follows.

(1) A method in which aluminum chloride is fully purified by a sublimation method, etc. The sublimation method is industrially preferred. When an apparatus for the sublimation has a wall of refractory bricks, however, it is necessary to take care that fine powders of the refractory bricks, etc., are not newly contained in aluminum chloride.

(2) A recrystallization method in which after aluminum chloride is dissolved in a proper solvent, impurities are removed by filtration, and the solvent is distilled off. Preferred are those solvents which do not decompose aluminum chloride and are easily distilled off. Such a solvent is selected from benzene, toluene, xylene, titanium tetrachloride, carbon tetrachloride, chloroform, ether, tetrahydrofuran, etc.

(3) A method in which, while a eutectic salt of aluminum chloride and sodium chloride is in a molten state, the eutectic salt is filtered to remove water-insoluble inorganic impurities.

The degree of the above purification differs depending upon the process for halogenating phthalocyanine, and can be properly selected depending upon the amount of aluminum chloride for use in the halogenation.

In the method in which phthalocyanine is halogenated while the phthalocyanine is dissolved in a eutectic salt of aluminum chloride and sodium chloride, aluminum chloride is used in an amount of 3 to 7 parts by weight per part of the phthalocyanine. In this case, it is preferred to purify aluminum chloride until the amount of water-insoluble inorganic impurities in the aluminum chloride is not more than 0.01 part by weight, preferably not more than 0.007 part by weight, more preferably not more than 0.003 per 100 parts by weight of aluminum chloride.

In the method in which phthalocyanine is halogenated in titanium tetrachloride in the presence of aluminum chloride, aluminum chloride is used in an amount of 0.7 to 3 parts by weight per part of the phthalocyanine. In this case, it is preferred to purify aluminum chloride until the amount of water-insoluble inorganic impurities in aluminum chloride is approximately not more than 0.03 part by weight, preferably not more than 0.007 part by weight per 100 parts by weight of the aluminum chloride.

When phthalocyanine is halogenated in the presence of aluminum chloride purified by any one of the above-described purification methods, there can be obtained a polyhalogenated phthalocyanine containing not more than 0.02 part by weight, per 100 parts by weight of the phthalocyanine before the halogenation, of water-insoluble inorganic impurities derived from the aluminum chloride. Further, when the above polyhalogenated phthalocyanine is formed into a pigment and combined with a vehicle, there can be obtained a printing ink composition which is excellent in form plate abrasion properties.

The printing ink composition of the present invention comprises 3 to 20% by weight of the polyhalogenated phthalocyanine of the present invention, 60 to 97% by weight of a vehicle and 0 to 20% by weight of an auxiliary and an extending pigment. The vehicle comprises 10 to 50% by weight of a resin mixture containing at least two of gum rosin, wood rosin, tall oil rosin, lime rosin, rosin ester, a maleic resin, a polyamide resin, a vinyl resin, nitrocellulose, an ethylene-vinyl acetate copolymer resin, a urethane resin, an alkyd resin, gilsonite, dammar, shellac, etc., 30 to 80% by weight of a solvent such as a hydrocarbon, an alcohol, a ketone, an ether alcohol, an ether, water, etc., and other auxiliary.

According to the present invention, there is provided a polyhalogenated phthalocyanine for use in a printing ink which is free from the defect in form plate abrasion properties of a conventional polyhalogenated phthalocyanine obtained by halogenating phthalocyanine in the presence of aluminum chloride, a process for the production of said polyhalogenated phthalocyanine, and a printing ink composition containing said polyhalogenated phthalocyanine.

According to the present invention, there is provided a polyhalogenated phthalocyanine for use in a printing ink which is especially suitable for gravure printing, a process for the production of said polyhalogenated phthalocyanine, and a printing ink composition containing said polyhalogenated phthalocyanine.

EXAMPLES

The present invention will be explained further in detail by reference to Examples, in which "part" stands for "part by weight" and "%" stands for "% by weight" unless otherwise specified.

PREPARATION EXAMPLES OF PURIFIED ALUMINUM CHLORIDE

Preparation Example 1

A glass sublimating apparatus having a cooling tube of an air cooling system was charged with 500 parts of industrial-use aluminum chloride, and the aluminum chloride was directed heated with fire to give 450 parts of purified aluminum chloride.

Preparation Example 2

550 Parts of the same purified aluminum chloride as that obtained in Preparation Example 1 was further treated in the same manner as in Example 1, whereby 500 parts of purified aluminum chloride was obtained.

Preparation Example 3

Under a nitrogen atmosphere, 500 parts of industrial-use aluminum chloride was charged into a Soxhlet extractor, and subjected to extraction with 350 parts of xylene to remove impurities. Xylene was distilled off from the resultant extract to give 420 parts of purified aluminum chloride.

DETERMINATION OF AMOUNT OF WATER-INSOLUBLE INORGANIC IMPURITIES

The amount of water-insoluble inorganic impurities was determined as follows: 100 Parts of aluminum chloride was gradually poured into 1,000 parts of ice water, and the mixture was heated up to 80° C. and stirred for 30 minutes to completely dissolve the aluminum chloride. The resultant acidic aqueous solution was filtered with a glass filter having a constant weight (glass filter G4, supplied by Shibata Kagaku Kikai Kogyo K. K.), and the filtration residue on the filter was washed with a solution of dilute hydrochloric acid in water, then fully washed with distilled water, and dried. Then, the constant amount of the dried filtration residue and the filter in total was determined. The amount of the impurities was determined by deducting the constant weight of the filter from the constant weight of the dried filtration residue and the filter.

Table 1 shows the amount of water-insoluble inorganic impurities in each of the aluminum chlorides obtained in Preparation Examples 1 to 3 and industrial-use aluminum chloride products A and B.

TABLE 1

| Sample | Amount of impurities*1 |
|---|---|
| Preparation Example 1 | 0.0055 |
| Preparation Example 2 | 0.0005 |
| Preparation Example 3 | 0.0015 |
| Industrial-use product A | 0.0195 |
| Industrial-use product B | 0.0175 |

Note *1: per 100 parts of aluminum chloride

Example 1

A mixture of 180 parts of the purified aluminum chloride obtained in Preparation Example 1 and 42 parts of sodium chloride was heated in a reactor to melt the mixture homogeneously. After the temperature inside the reactor was decreased to 100° to 110° C., 50 parts of copper phthalocyanine was added, and the temperature inside the reactor was increased up to 160° to 170° C. by heating. Thereafter, a chlorine gas was introduced to the reactor at a rate of 7 to 10 parts/hour for 10 to 15 hours. After the chlorination, the melt was discharged into water and filtered, and the remaining solid was washed with water to give 87 parts of polychlorinated copper phthalocyanine.

Example 2

Example 1 was repeated except that 180 parts of the purified aluminum chloride obtained in Preparation Example 1 was replaced with 180 parts of the purified aluminum chloride obtained in Preparation Example 2, whereby 85 parts of polychlorinated copper phthalocyanine was obtained.

Example 3

Example 1 was repeated except that 180 parts of the purified aluminum chloride obtained in Preparation Example 1 was replaced with 180 parts of the purified aluminum chloride obtained in Preparation Example 3, whereby 85 parts of polychlorinated copper phthalocyanine was obtained.

Example 4

A reactor was charged with 600 parts of titanium tetrachloride, 50 parts of copper phthalocyanine and 38 parts of the purified aluminum chloride obtained in Preparation Example 1, and while the resultant mixture was stirred, the temperature inside the reactor was increased up to 110° to 115° C. While the temperature was kept at 110° to 115° C., the mixture was stirred for 8 hours. Then, the temperature was increased to 135° to 137° C., and while the temperature was kept at 135° to 137° C., chlorine gas was introduced to the reactor at a rate of 5 parts/hour for 5 hours. Thereafter, 12 parts of the purified aluminum chloride obtained in Preparation Example 1 was added, and chlorine gas was introduced to the reactor at a rate of 5 parts/hour for 5 hours. Then, 10 parts of the purified aluminum chloride obtained in Preparation Example 1 was added, and chlorine gas was introduced into the reactor at a rate of 5 parts/hour for 18 hours to give 89 parts of green polychlorinated copper phthalocyanine.

Example 5

Example 4 was repeated except that the purified aluminum chloride obtained in Preparation Example 1 was replaced with the purified aluminum chloride obtianed in Preparation Example 4, whereby 89 parts of green polychlorinated copper phthalocyanine was obtained.

Example 6

A reactor was charged with 600 parts of titanium tetrachloride, 50 parts of copper phthalocyanine and 38 parts of the purified aluminum chloride obtained in Example 1, and while the resultant mixture was stirred, the temperature inside the reactor was increased up to 110° to 115° C. While the temperature was kept at 110° to 115° C., the mixture was stirred for 8 hours. Then, the temperature was increased up to 135° to 137° C., and while the temperature was kept at 135° to 137° C., bromine was introduced into the reactor at a rate of 5 parts/hour for 5 hours. Thereafter, 12 parts of the purified aluminum chloride obtained in Preparation Example 1 was added, and bromine was introduced at a rate of 5 parts/hour for 5 hours. Then, 10 parts of the purified aluminum chloride obtained in Preparation Example 1 was added, and bromine was introduced at a rate of 5 parts/hour for 18 hours. Further, the reaction was continued for 200 hours to give 13 parts of green polybrominated copper phthalocyanine.

Comparative Example 1

Example 1 was repeated except that 180 parts of the purified aluminum chloride obtained in Preparation Example 1 was replaced with 180 parts of the industrial product A (aluminum chloride) which had not been purified, whereby 84 parts of polychlorinated copper phthalocyanine was obtained.

Comparative Example 2

Example 4 was repeated except that the purified aluminum chloride obtained in Preparation Example 1 was replaced with 60 parts of the industrial product A (aluminum chloride) which had not been purified, whereby 87 parts of polychlorinated copper phthalocyanine was obtained.

Examples 7-12 and Comparative Examples 3 and 4

The polyhalogenated copper phthalocyanines obtained in the above Examples 1 to 6 and Comparative Examples 1 and 2 were individually wet-milled together with sodium chloride to form pigments, and the pigments were separately prepared into ink compositions in the following manner. In addition, the polyhalogenated copper phthalocyanines obtained in Examples 1 to 6 correspond to ink compositions prepared in Examples 7 to 12, and the polyhalogenated copper phthalocyanines obtained in Comparative Examples 1 and 2 correspond to ink compositions prepared in Comparative Examples 3 and 4.

500 parts of nitrocellulose, 100 parts of dioctyl phthalate, 300 parts of ethyl acetate and 2,000 parts of methanol were together stirred with a high-speed stirrer to form a homogeneous vehicle. 40 Parts of the pigment and 250 parts of the vehicle were dispersed together with 2,000 parts of steel balls (having a diameter of 11/16 inches) in a vibration mill for 3 hours. Then, the steel balls were removed from the resultant ink composition, and the composition was adjusted with a mixed solvent (methanol:ethyl acetate=6:1) to a viscosity of 25 seconds (with Zahn cup No. 3).

TEST OF PRINTING INK ON FORM PLATE ABRASION

A form plate of which the weight had been determined was set at an abrasion tester ATII (supplied by Karl Schroeder KG), and the plate was scraped in 350 g of the ink composition by rotating the tester 125,000 times (doctor blade contacts: 500,000 times). The form plate was taken out of the tester, fully washed with a solvent, dried and weighed. The weight loss of the form plate was taken as a plate form abrasion loss. Table 2 shows the amounts of impurities in the halogenated copper phthalocyanines and the test results.

TABLE 2

| Sample | Amount of impurities (part)*2 | Form plate abrasion loss (mg) |
| --- | --- | --- |
| Example 7 | 0.0198 | 18.8 |
| Example 8 | 0.0018 | 6.2 |
| Example 9 | 0.0054 | 8.5 |
| Example 10 | 0.0066 | 9.1 |
| Example 11 | 0.0006 | 5.3 |
| Example 12 | 0.0006 | 4.9 |
| Comparative Example 3 | 0.0702 | 45.3 |
| Comparative Example 4 | 0.0234 | 26.7 |
| Control*3 | 0.0000 | 4.7 |

Note *2: per 100 parts of copper phthalocyanine before the halogenation
Note *3: Copper phthalocyanine which was not halogenated.

What is claimed is:

1. A polyhalogenated phthalocyanine for use in a printing ink, said polyhalogenated phthalocyanine being obtained by halogenation of phthalocyanine in the presence of aluminum chloride and containing not more than 0.02 part by weight, per 100 parts by weight of the phthalocyanine before the halogenation, of water-insoluble inorganic impurities derived from the aluminum chloride.

2. A polyhalogenated phthalocyanine according to claim 1, which contains at least one central metal selected from the group consisting of copper, iron, nickel, aluminum and titanium.

3. A polyhalogenated phthalocyanine according to claim 1, which contains no central metal.

4. A polyhalogenated phthalocyanine according to claim 1, which contains at least 4 halogen atoms per phthalocyanine molecule.

5. A polyhalogenated phthalocyanine according to claim 1, which is obtained by halogenation of a phthalocyanine in a eutectic salt of aluminum chloride and sodium chloride.

6. A polyhalogenated phthalocyanine according to claim 5, which is obtained by halogenation of a phthalocyanine in a eutectic salt of aluminum chloride containing not more than 0.01 part by weight, per 100 parts by weight of the aluminum chloride, of water-insoluble inorganic impurities and sodium chloride.

7. A polyhalogenated phthalocyanine according to claim 1, which is obtained by halogenation of a phthalocyanine in titanium tetrachloride in the presence of aluminum chloride.

8. A polyhalogenated phthalocyanine according to claim 7, which is obtained by halogenation of a phthalocyanine in titanium tetrachloride in the presence of aluminum chloride containing not more than 0.03 parts by weight, per 100 parts by weight of the aluminum chloride, of water-insoluble inorganic impurities.

9. A process for the production of a polyhalogenated phthalocyanine for use in a printing ink, which comprises halogenating phthalocyanine in the presence of purified aluminum chloride, the polyhalogenated phthalocyanine containing not more than 0.02 part by weight, per 100 parts by weight of the phthalocyanine before the halogenation, of water-insoluble inorganic impurities derived from the aluminum chloride, and the process comprising any one of the following methods (a), (b) and (c);

(a) halogenating phthalocyanine in a eutectic salt of purified aluminum chloride and sodium chloride, (b) removing water-insoluble inorganic impurities from a eutectic salt of aluminum chloride and sodium chloride and halogenating phthalocyanine in the resultant eutectic salt, and (c) halogenating phthalocyanine in titanium tetrachloride in the presence of purified aluminum chloride.

10. A process according to claim 9, wherein the purified aluminum chloride is a product obtained by sublimation or recrystallization of aluminum chloride.

11. In a printing ink composition containing a polyhalogenated phthalocyanine, the improvement according to which the polyhalogenated phthalocyanine is as defined in claim 1.

* * * * *